United States Patent

Kapich

[11] Patent Number: 5,471,965
[45] Date of Patent: Dec. 5, 1995

[54] VERY HIGH SPEED RADIAL INFLOW HYDRAULIC TURBINE

[76] Inventor: Davorin D. Kapich, 3111 Serrano Dr., Carlsbad, Calif. 92009

[21] Appl. No.: 344,231

[22] Filed: Nov. 23, 1994

Related U.S. Application Data

[63] Continuation-in-part of Ser. No. 214,226, Mar. 17, 1994, Pat. No. 5,421,310, which is a continuation-in-part of Ser. No. 104,196, Aug. 10, 1993, Pat. No. 5,346,364, which is a continuation-in-part of Ser. No. 890,370, May 26, 1992, Pat. No. 5,236,305, which is a continuation of Ser. No. 655,575, Dec. 24, 1990, abandoned.

[51] Int. Cl.$^6$ .............................. F02B 39/08; F03B 1/04
[52] U.S. Cl. .............................................. 123/565; 415/202
[58] Field of Search .................... 60/607, 608; 123/565; 415/202

[56] References Cited

U.S. PATENT DOCUMENTS

| | | | |
|---|---|---|---|
| 768,116 | 8/1904 | Dutton | 415/202 |
| 976,109 | 11/1910 | Wellman | 415/202 |
| 2,204,169 | 6/1940 | Zerkowitz | 415/202 |
| 2,368,033 | 1/1945 | Makaroff | 415/202 |
| 2,968,914 | 1/1961 | Birmann | 60/608 |
| 3,141,909 | 7/1964 | Mayo . | |
| 3,607,779 | 9/1971 | King . | |
| 3,759,290 | 9/1973 | D'Alba | 415/201 |
| 4,066,381 | 1/1978 | Earnest . | |
| 4,597,524 | 7/1986 | Albertson . | |
| 4,610,235 | 9/1986 | Grunig | 123/565 |
| 4,927,407 | 5/1990 | Dorman | 415/112 |
| 5,145,333 | 9/1992 | Smith | 415/202 |
| 5,346,364 | 9/1994 | Kapich | 415/202 |

FOREIGN PATENT DOCUMENTS 1561083  2/1980  United Kingdom ................... 415/202

Primary Examiner—Michael Koczo
Attorney, Agent, or Firm—John R. Ross

[57] ABSTRACT

A very high speed radial inflow hydraulic turbine drive. Inflow nozzles drilled in a nozzle body intersect a circular nozzle body exit surface, the centerline of each nozzle forming an angle of between 8 and 25 degrees with the tangent of the exit circle at the point of intersection. The turbine wheel of the drive is small. Its diameter measured at the tips of the blades is less than 2 inches. In a preferred embodiment, built and tested by Applicant, the wheel is only 0.80 inch diameter. This embodiment was tested with a turbine hydraulic fluid pressure drop of 700 psi and flow of 19.5 GPM. The 0.8 inch turbine produced 5.9 HP at 62,000 RPM driving the compressor portion of a TO4B-V turbocharger. The compressed air flow was measured at 11.3 pounds per minute (161.4 inlet CFM) at a pressure ratio of 1.41. During the test the acceleration of the supercharger was measured from idle to 62,000 RPM in about ½ second. This preferred embodiment utilizes a plastic-metal turbine wheel in which the plastic portion of the wheel other than the blades is solidly anchored within a metal containing wheel. In other preferred embodiments the turbine drive drives superchargers for supercharging internal combustion engines such as bus and truck turbodiesel engines. The superchargers provided by the present invention produce immediate response to engine demand for increased combustion air and will dramatically reduce smoke emission during low speed acceleration of these bus and truck engines as well as greatly improve engine efficiency.

9 Claims, 10 Drawing Sheets

VERY HIGH SPEED RADIAL INFLOW HYDRAULIC TURBINE

TECHNICAL FIELD

This is a Continuation-In-Part Application of U.S. patent application No. 08/214,226 filed Mar. 17, 1994, U.S. Pat. No. 5,421,310, which is a continuation-in-part of U.S. patent application No. 08/104,196 filed Aug. 10, 1993 (now U.S. Pat. No. 5,346,364) which is a continuation in part of U.S. patent application No. 07/890,370 filed May 26, 1992 (now U.S. Pat. No. 5,236,305) which is a continuation of U.S. patent application No. 07/655,575, filed Dec. 24, 1990, now abandoned. This invention relates to high speed turbine drives and especially to hydraulic drives for driving supercharger systems.

BACKGROUND OF THE INVENTION

High speed rotating devices are often driven by electric motors or internal combustion engines. The use of radial in-flow hydraulic turbines to drive fans and pumps is well known to the art. For example, U.S. Pat. No. 3,607,779 by Earle C. King illustrates the use of a radial inflow water turbine at the front end of the shaft driving a relatively low pressure rise axial fan and a foam concentrate pump at the rear end of the shaft. U.S. Pat. No. 4,597,524 issued to Stig L. Albertson describes a snow making machine with air flow fan being belt driven by a multistage water turbine. U.S. Pat. No. 3,141,909 by H. A. Mayo, Jr. describes turbine drive for cooling tower fan utilizing an radial outflow water turbine driving a fan.

There are a number of manufacturing companies which produce portable radial inflow hydraulic turbines. Hale Fire Pump Company of Conshohocken, Pa. and Coppus Portable Ventilation and Turbine Division of Tuthill Corp. of Millbury, Mass. produce radial inflow hydraulic turbines for driving air ventilation fans. Gilkes Inc. of Seabrook, Tex. produces radial inflow hydraulic turbines to drive liquid removal and transfer pumps.

A large majority of these turbines are driven by water pressure between 100 and 200 psi, which is a standard fire hose pressure in the U.S., on shore and aboard the ships. These are relatively low pressure turbines and are relatively large in size and weight.

Their method of construction cannot tolerate very high hydraulic pressures and high hydraulic fluid temperatures. They are also not suitable for speeds required to drive typical very high speed compressor superchargers.

A hydraulic Pelton turbine has been employed to drive a turbocharger in UK Pat. No. 2,127,897 by Ricardo Carricante. Main disadvantage of this concept is that the Pelton turbine cannot be submerged in hydraulic fluid, which would cause drastic loss in efficiency. This requires high positioning of the turbocharger above the engine oil sump in order to facilitate an air cavity around the turbine wheel and drainage of relatively large oil flow that drives the turbine. This situation sometimes causes air entrainment and foaming problems in the engine oil. Other motors considered as drives, such as vaned motors, are usually not long lived at typical high turbocharger speeds.

A radial inflow supersonic turbine with nozzle holes in an axial-tangential arrangement is shown in the U.S. Pat. No. 4,066,381 by E. R. Earnest. The nozzles here are drilled through a flat plate under a combined axial and tangential angles. Such manufacturing methods are usually very expensive because of tight tolerances needed to position the exit of the combined angle nozzles accurately and the fact that the supersonic section must be drilled separately from the other initially drilled hole from the first side. The radial-axial turbine wheel has three dimensional geometry which makes the wheel manufacturing very expensive.

Superchargers are air pumps or blowers in the intake system of an internal combustion engine for increasing the mass flow rate of air charge and consequent power output from a given engine size. Turbosuperchargers (normally called turbochargers) are engine exhaust gas turbine driven superchargers. When superchargers are driven mechanically from the shaft of the internal combustion engine, a speed increasing gear box or belt drive is needed. Such superchargers are limited to a relatively low rotating speed and are large in size. Paxon Blowers and Vortech Engineering Co. are marketing such superchargers. Fixed gear ratio superchargers suffer from two very undesirable features: 1) there is a sharp decrease in boost pressure at low engine RPM because boost pressure goes generally to the square of the speed of rotation, and 2) it is generally difficult to disconnect the supercharger from the engine when the supercharger is not needed.

There is a great need in the engine industry for an efficient method for driving compact, light weight superchargers. According to an article at page 27 of the August 1993 issue of Popular Science, Miller cycle engines, developed by Mazda require "a compact, high-efficiency air compressor—conventional turbochargers and superchargers just can't generate the volume of air required". The article further states, "Mazda teamed with heavy equipment manufacturer Ishikawajima-Harima Heavy Industries Co. to develop a belt driven, screw-type compressor supercharger. The new supercharger is expensive, which is one reason Mazda doesn't plan to use the Miller-cycle engine in small cars. Lean-burn technology makes more sense there . . . ".

Detroit Diesel Corporation is employing a low inertia ceramic turbocharger turbine wheel to provide a more responsive turbocharger. In their recent literature promoting their Series 50 turbo diesel engine they state, "The lower inertia ceramic turbine wheel is used to provide a more responsive turbocharger for faster response and higher performance so critical for transit bus operation."

Mercedes-Benz AG has recently announced that they were using a mechanically driven wankel rotary type air compressor made by Ogura as a supercharger. The wankel supercharger is positioned upstream and in series with a standard supercharger. The supercharger operates at a fixed speed at a 5.5:1 ratio with the engine speed.

There is a great need for supercharging of present turbocharged diesel engines. In the low RPM range, the currently available turbocharging systems are not very effective in producing sufficient engine manifold pressure and power required for satisfactory vehicle acceleration and exhaust smoke reduction. This applies especially to "stop and go" type services, such as city buses and trash collecting trucks. A thermodynamic cycle analysis of a typical truck turbodiesel engine shows that even with modest 2 to 3 psi supercharging applied in series to the inlet of the existing turbocharger compressor in the low engine RPM range, the existing turbocharger pressure ratio increases exponentially mainly due to a large increase in turbocharger turbine power.

A typical 250 HP four stroke turbodiesel engine with supercharger/turbocharger staged in series, is projected to experience a 61% increase in power at 800 RPM and 72% at 1000 RPM but drops off to 67% at 1200 RPM and about 33% at 1400 RPM. Many presently available direct driven superchargers cannot be disconnected when not needed, which would generally occur above 1400 RPM, when turbocharger system alone, starts being effective. Not being able to disconnect the supercharger produces drag on the engine as the engine speed increases up to full speed which is usually around 2500 RPM. When clutches are provided to provide disconnects, the frequency of the disconnects may result in short clutch life.

A popular exhaust driven turbocharger is Model TO4B 3S supplied by Turbonetics Inc. This unit can produce compressor ratio (output pressure/atmospheric pressure) of 2.50. The various parts of this unit can be purchased separately from Turbonetics as listed in its catalog.

Gear driven and belt driven oil pumps are commercially available in the 10 to 20 HP range for producing oil pressures in the range of 500 to 2,000 PSIG at flows of 20 to 40 GPM.

The Applicant has been issued a United States patent (U.S. Pat. No. 5,013,214) for a high speed water driven fan. Disclosed in the specification was a turbine which produced 4 horsepower at 10,000 RPM. The specification referred to and provided guidance for increased horsepower designs and higher RPM's. Relatively low stress levels and low operating temperature of the turbine wheel driving the fan has allowed for the 2.07 inch diameter wheel to be made entirely of Delrin type plastic.

It is known that plastic turbines are generally less expensive to produce than metal turbines, but at very high rotating speeds and high temperatures plastic turbines do not have sufficient strength to provide reliable performance. Very small steel turbine wheels are difficult to manufacture using standard milling procedures and electro discharge machining is very expensive. Typical production costs of making a 0.80 inch diameter turbine wheel with 34 blades is on the order of $300. Sintering is another possibility, but its tooling costs would be very high.

Utilization of high temperature thermoplastics to make very high speed turbine wheels would lower the cost significantly since the blades could be milled with conventional techniques, but the combined effects of high centrifugal stresses and high oil temperatures would cause the plastic to deform and creep with time, especially in the hub area where precision fit between the shaft and the wheel bore is required at all times.

What is needed, is a very high precision, rugged, low cost miniature turbine wheel and nozzle, that can withstand high hydraulic fluid pressures and temperatures while operating at speeds of 50,000 to 150,000 RPM while maintaining its basic dimensions and structural integrity for a long time with the capacity to respond very quickly on demand.

SUMMARY OF THE INVENTION

The present invention provides a very high speed radial inflow hydraulic turbine drive. Inflow nozzles drilled in a nozzle body intersect a circular nozzle body exit surface, the centerline of each nozzle forming an angle of between 8 and 25 degrees with the tangent of the exit circle at the point of intersection. The turbine wheel of the drive is small. Its diameter measured at the tips of the blades is less than 2 inches. In a preferred embodiment, built and tested by Applicant, the wheel is only 0.80 inch diameter. This embodiment was tested with a turbine hydraulic fluid pressure drop of 700 psi and flow of 19.5 GPM. The 0.8 inch turbine produced 5.9 HP at 62,000 RPM driving the compressor portion of a TO4B-V turbocharger. The compressed air flow was measured at 11.3 pounds per minute (161.4 inlet CFM) at a pressure ratio of 1.41. During the test the acceleration of the supercharger was measured from idle to 62,000 RPM in about ½ second. This preferred embodiment utilizes a plastic-metal turbine wheel in which the plastic portion of the wheel other than the blades is solidly anchored within a metal containing wheel. In other preferred embodiments the turbine drive drives superchargers for supercharging internal combustion engines such as bus and truck turbodiesel engines. The superchargers provided by the present invention produce immediate response to engine demand for increased combustion air and will dramatically reduce smoke emission during low speed acceleration of bus and truck engines as well as greatly improve engine efficiency.

DETAILED DESCRIPTION OF PREFERRED EMBODIMENT

Turbine Wheel

Figure 1:
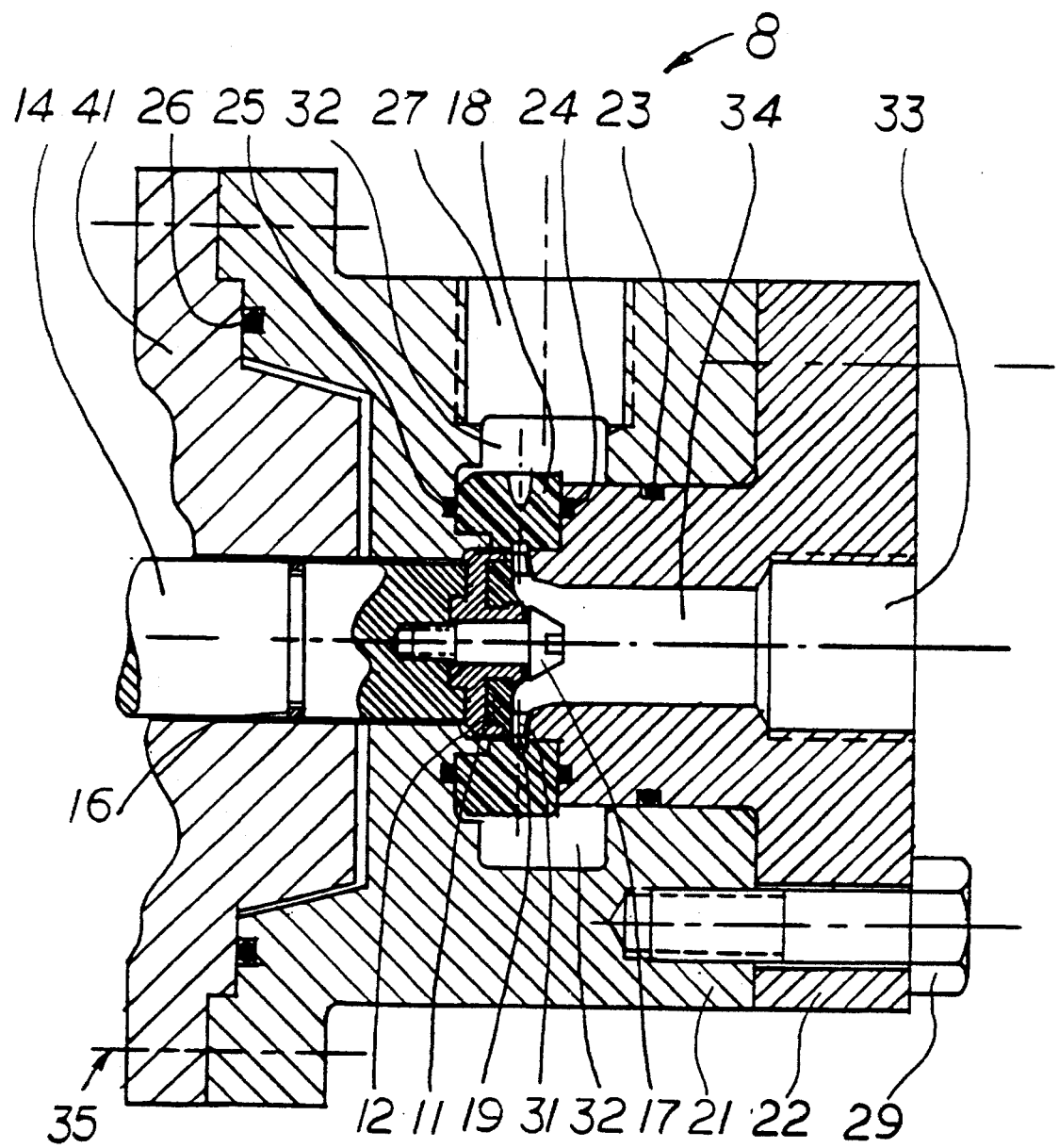
FIG. 1 is a cross sectional drawing showing a preferred embodiment of a very high speed turbine drive.

Described herein by reference to FIG. 1 is a turbine with a wheel of only 0.800 inch diameter with the capability of generating 9.6 HP at 69,750 RPM, with pressure differentials of 930 psi and having the capability of operating at the fluid temperatures of 150 to 250 degrees Fahrenheit.

Figure 9:
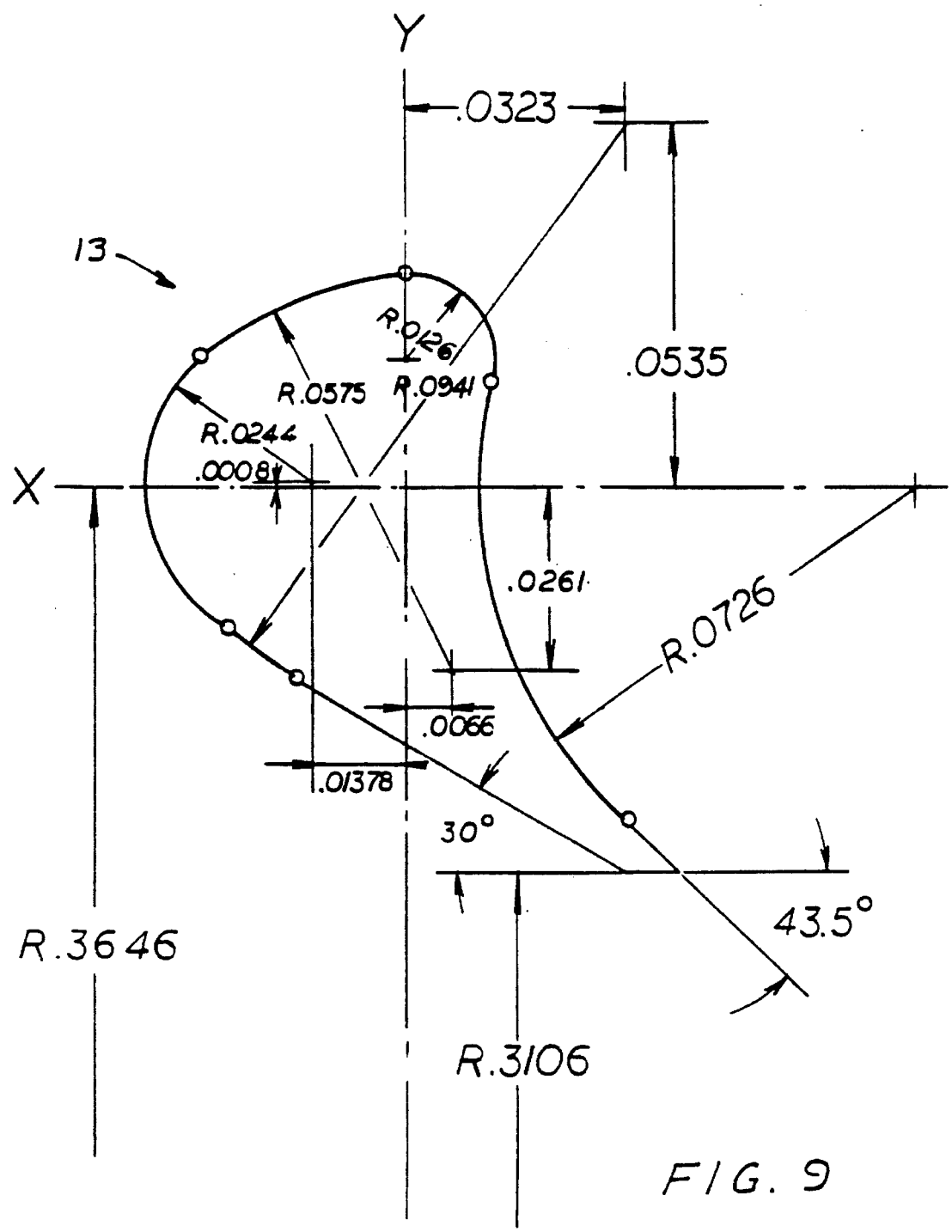
FIG. 9 shows blade dimensions.

Turbine drive 8 includes turbine wheel 11 with 27 turbine blades 31 which are preferably formed in an injection molding process. The plastic is pressure injected into a mold containing a containing wheel 11 (which is a metal such as steel) forming an integral assembly of plastic turbine wheel 12, metal wheel 11 and plastic turbine blades 31. The metal containing wheel 11 is precisely centered into the turbocharger shaft 14 and held axially by self locking steel fastener 17. Compressive load generated by the self locking steel fastener 17 is sufficient to facilitate the torque transfer from the metal containing wheel 11 into the turbocharger shaft 14 under all anticipated torque loads, fluid temperatures and rotating speeds. During the normal operation the temperature of hydraulic oil is usually in the range of 150 to 250 degrees Fahrenheit which expands the metal containing wheel 11 axially slightly more than the self locking steel fastener 17 and the turbocharger shaft 14, thus increasing the compressive load in the metal containing wheel 11 and the torque transfer capability slightly above the cold assembly condition. The centrifugally and thermally induced stresses in the plastic turbine wheel 12 which is solidly anchored inside the metal containing wheel 11 are to a great extent being absorbed by the metal containing wheel 11. Blade dimensions are shown in FIG. 9. As indicated on FIG. 3 and FIG. 9, the plastic turbine blades 31 are of the radial inflow type with rounded leading edges to minimize the erosion tendency sometime caused by very high hydraulic oil velocity as combined with sharp, thin leading edges. The radial inflow type blading geometry allows, after the blades are cast, the plastic mold to be withdrawn axially out from the blades. The blades of the turbine wheel are made of high strength thermoplastic material, Polysulfone, which is pressure injected into a mold holding the steel portion of the wheel which together form an integral metal/plastic turbine wheel and blade. Vespell, a high temperature plastic made by DuPont, has also been successfully tested for this application.

Turbine Parts and Its Operation

Turbine discharge housing 22 is solidly bolted by six bolts 29 to the turbine inlet housing 21 which is solidly bolted by a series of bolts at 35 to the commercially supplied (T04 form Turbonetics) turbocharger housing 41. Turbine nozzle ring 18, preferably made from Polysulfone, is held in a precise axial and radial position by the turbine inlet housing 21 and the turbine discharge housing 22. Nozzle ring 18, inlet housing 21 and discharge housing 22 together define toroidal inlet cavity 32. The high oil pressure contained inside inlet cavity 32 is sealed by O-Ring 24 and O-Ring 25 which prevents any leakage from inlet cavity 32 to the discharge cavity 34 along the contact surfaces between turbine nozzle ring 18, turbine inlet housing 21 and turbine discharge housing 22. A substantial portion of the inside diameter of the turbine nozzle ring 18 is supported radially by matching diameters of turbine inlet housing 21 and turbine discharge housing 22 which restrain radial deformation of the turbine nozzle body 18 and to a great degree absorb inwardly compressive pressure generated by the high pressure hydraulic fluid contained inside inlet cavity 32. The axial dimension of the turbine nozzle ring 18 is precisely matched with the axially allowable space between turbine discharge housing 22 and turbine inlet housing 21. At normal operating temperatures the turbine nozzle ring 18 expands slightly more than the matching surfaces of turbine inlet housing 21 and turbine inlet housing 22 which essentially restrain the axial expansion of the turbine nozzle ring 18 and produces a moderate axial compressive stress in the turbine nozzle ring 18. Commercially supplied sliding seal ring 16 provides the oil seal between the commercially supplied turbocharger housing 41 and the turbocharger shaft 14. O-Ring 26 seals the relatively low oil pressure around the turbocharger shaft 14 from leaking to ambient. O-Ring 23 seals the high oil pressure contained in inlet cavity 32 from leaking to ambient.

Figure 4:
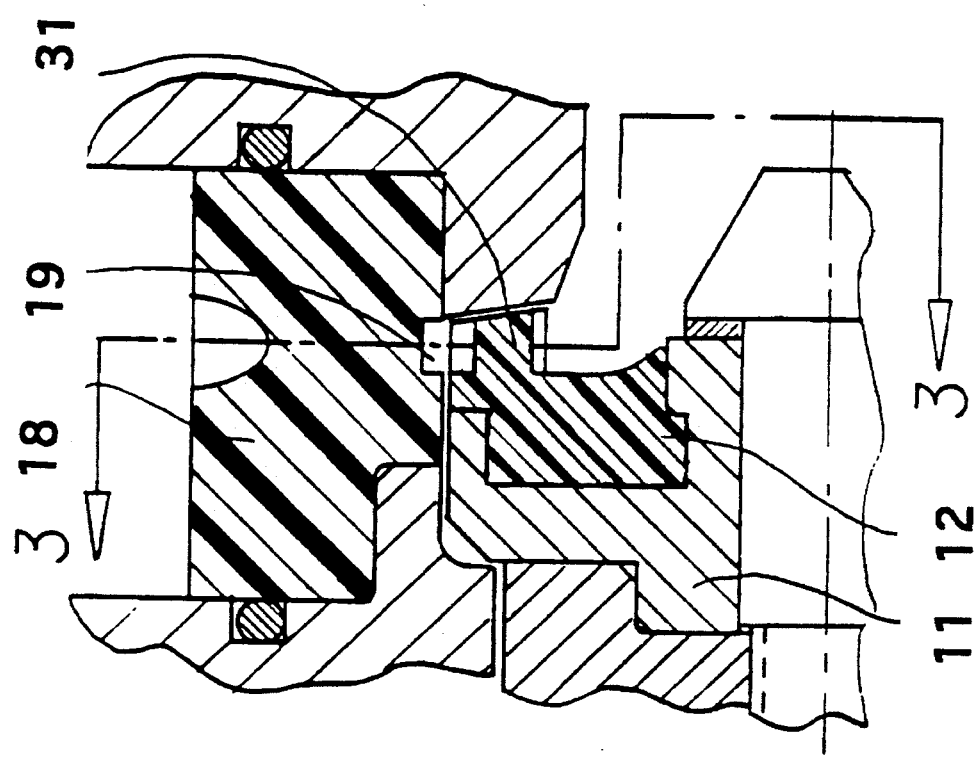
FIGS. 3 and 4 are drawings showing views of the nozzle arrangement of the turbine drive shown in FIG. 1.
Figure 3:
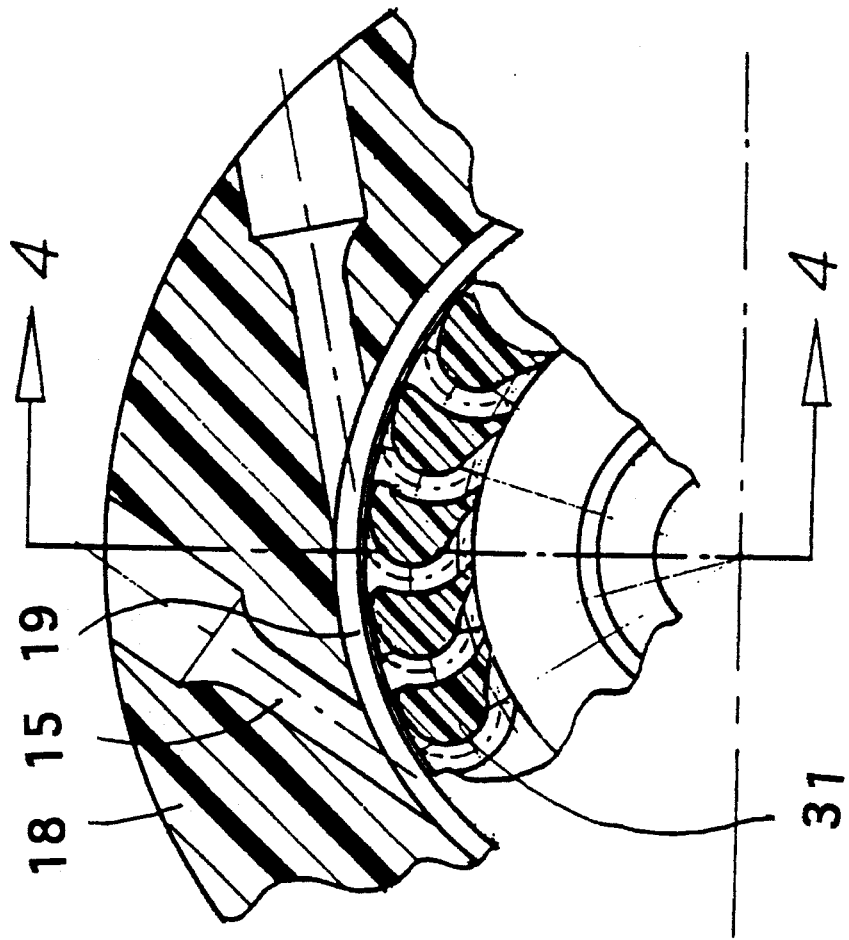

As indicated in FIGS. 3 and 4, in this embodiment eight turbine nozzles 15 are drilled in a radial plane, through the turbine nozzle ring 18 at an angle of 11 degrees with the tangent to a circle of the plastic turbine blades 31 outer diameter. The center lines of the turbine nozzles 15 positioned in a radial plane cause high pressure hydraulic fluid to accelerate radially inward from the inlet cavity 32 through turbine nozzles 15 into the vaneless passage 19 and into the inlet of the plastic turbine blades 31 where the hydraulic fluid momentum is converted into shaft power by well known principles. FIG. 3 shows the plan view of the exit portion of the turbine nozzles 15 as viewed in the plane 3—3 in FIG. 4. FIG. 4 shows a section through the nozzle ring 18 along the plane 4—4 in FIG. 3. The nozzle outlet surface is shown at 3 in FIGS. 3 and 4, and this surface is hereinafter referred to as the "turbine nozzle body outlet surface". As shown at 4 in FIG. 3 the centerlines of nozzles 15 intersect the nozzle body exit surface on a circle which I refer to as the "nozzle exit circle". High hydrodynamics efficiency of nozzles 15 is attributed to the particular combination of round cross sectioned turbine nozzles 15 and the gradual change in the cross section of the flow area along the centerline axis of the individual turbine nozzles 15. The eight turbine nozzles 15 are positioned close to each other within the turbine nozzle ring 18 so as to produce minimum wakes of low velocity fluid in the vaneless passage 19 and turbine blades 31. Such wakes are considered to be generally harmful to the turbine hydraulic efficiency. Such nozzle positioning as shown in FIG. 3 and 4 maximizes the percentage of the turbine blades radial flow area occupied by the high velocity fluid relatively to the radial flow area occupied by the wakes. Also, providing vaneless passage 19 permits each of nozzles 15 to be drilled without drilling into other nozzles.

During operation high pressure oil (preferably at about 900 psi) enters the turbine via inlet channel 27. It flows into inlet cavity 32 which supplies the oil flow to the 8 nozzle passages 15 which are contained within turbine nozzle ring 18. The oil flow accelerates through nozzle passages 5 converting pressure energy into kinetic energy which is then utilized to provide a driving force to the plastic turbine blades 31. Oil exits from the plastic turbine blades 31 into exit cavity 34 and is discharged at low pressure through exit channel 33.

Design Details—Three Models

The hydraulic turbine drive described herein will provide very substantial advantages in cost and performance as compared to prior art turbine drives, especially for high speed turbine drives in the 50,000 to 150,000 RPM and 5 to 25 horsepower ranges. I provide in the following table design details applicable to three preferred embodiments recommended for use as drives for motor vehicle superchargers.

| MODEL | 1 | 2 | 3 |
| --- | --- | --- | --- |
| Engine Power (HP) | 140 | 220 | 300 |
| Turbonetics Compressor Model | TO4B S3 | TO60-1 | TO67 |
| Compressor Pressure Ratio | 1.52 | 1.52 | 1.52 |
| Hydraulic Turbine Power (HP) | 9.6 | 14.8 | 19.5 |
| Hydraulic Turbine Pressure (PSIG) | 930 | 1020 | 1130 |
| Hydraulic Turbine Flow (GPM) | 23.5 | 32.0 | 38.0 |
| Hydraulic Turbine Efficiency | 0.75 | 0.77 | 0.78 |
| Hydraulic Turbine Speed (RPM) | 69,750 | 64,500 | 62,500 |
| Hydraulic Turbine Wheel Dia. (mm) | 20 | 20 | 22 |
| Hydraulic Turbine Blade Height (mm) | 1.55 | 1.58 | 1.65 |
| Number of Nozzles | 8 | 8 | 12 |
| Nozzle Angle (DEG.) (measured from tangent) | 11 | 11 | 11 |
| Rotor Blade Angle (DEG.) | 28 | 28 | 28 |
| Number of Rotor Blades | 27 | 27 | 30 |

The above parameters are chosen for supercharging non-turbocharged engines. When supercharging similar size turbocharged engines the operating parameter requirements will be lowered appropriately using well known thermodynamic principals.

Alternate Turbine Arrangements

Figure 6:
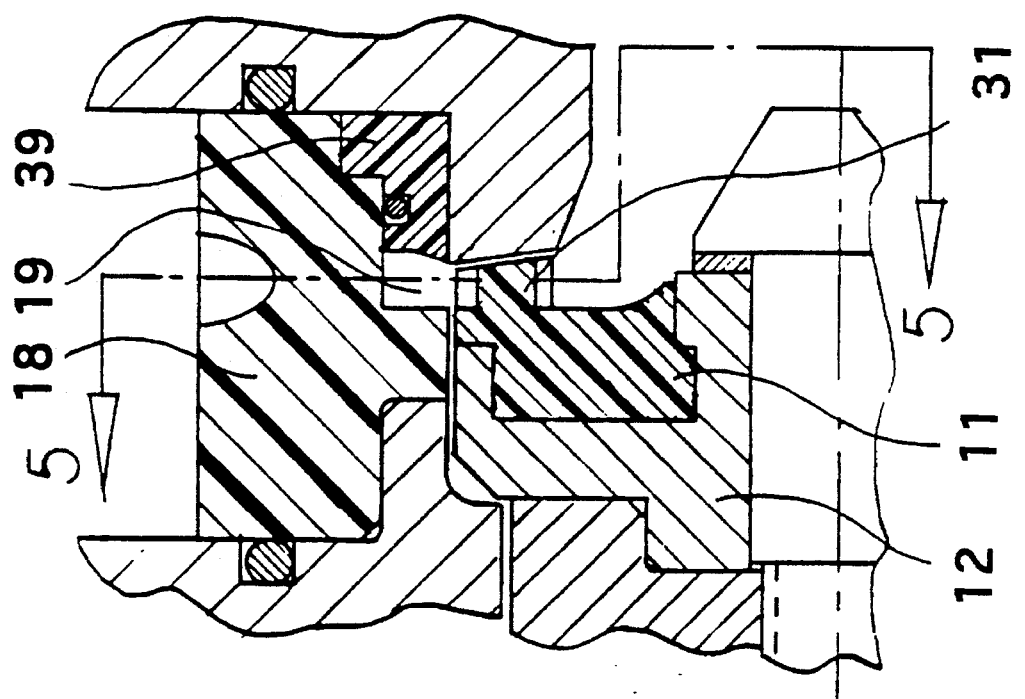
FIGS. 5 and 6 show an alternate arrangement similar to that shown in FIGS. 3 and 4.
Figure 5:
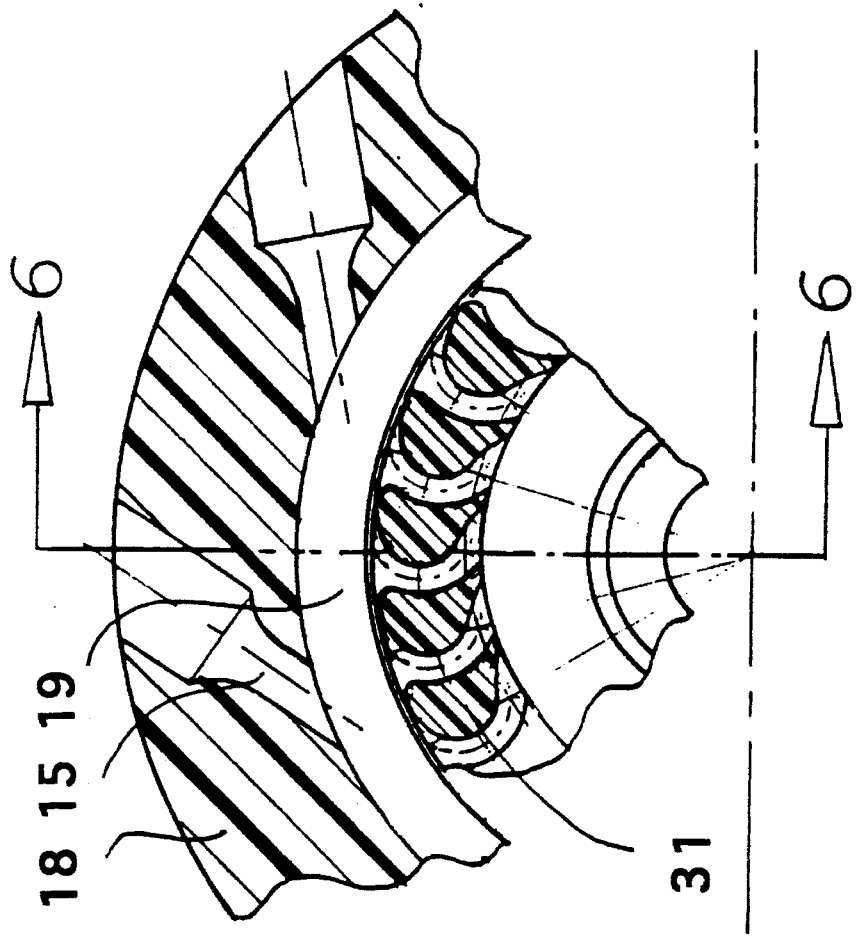

An alternate turbine arrangement is shown in FIGS. 5 and 6. This arrangement provides for better matching of the hydraulic turbine with different sizes of supercharging compressor wheels, without the necessity for changing basic turbine blades, tooling and nozzle tooling. FIG. 5 which represents section 5—5 in FIG. 6 shows the vaneless passage 19 having increased radial depth as compared to preferred embodiment shown in FIG. 3 and 4. FIG. 6 which represents section 6—6 in FIG. 5 shows ring insert 39 forming conically slanted sidewall of vaneless passage 19, which decreases axial width of vaneless passage 19 with decreasing radius. The plastic turbine blades 31 are axially shorter, matching the width of the vaneless passage 19 at the exit of the vaneless passage 19. The change in vaneless passage 19 width affects mainly the radial velocity component of the free vortex flow that is predominant in the vaneless passage 19. Since the tangential velocity component is governed by the law of conservation of momentum, it is inversely proportional to the change in radius and is generally not affected by the change in the width of the vaneless passage 19. By changing the radial velocity component at different rate than the tangential velocity component, the angle of velocity exiting the vaneless passage 19 will change with different width of ring inserts 39 and will affect the turbine operating speed at the point of maximum turbine power, which is one of the objectives of this alternate embodiment. With decreased width of vaneless passage 19, the hydraulic fluid will accelerate partially through the nozzles 15 and partially through the vaneless passage 19, which will affect the turbine pressure vs flow characteristics, which is another objective of this alternative embodiment.

Figure 8:
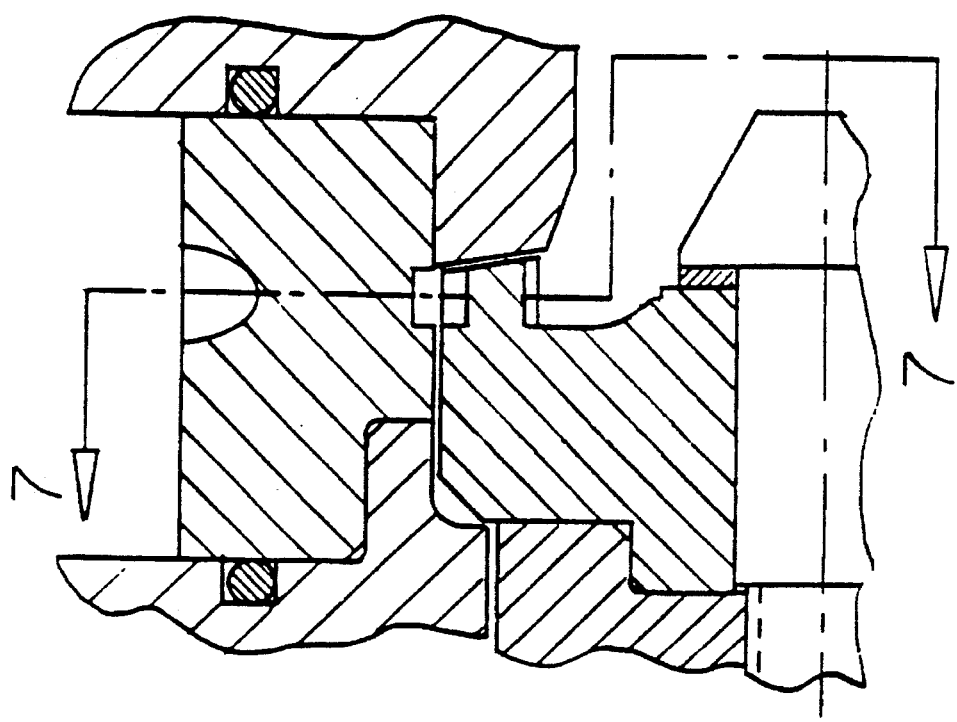
FIGS. 7 and 8 show views of an all metal turbine wheel.
Figure 7:
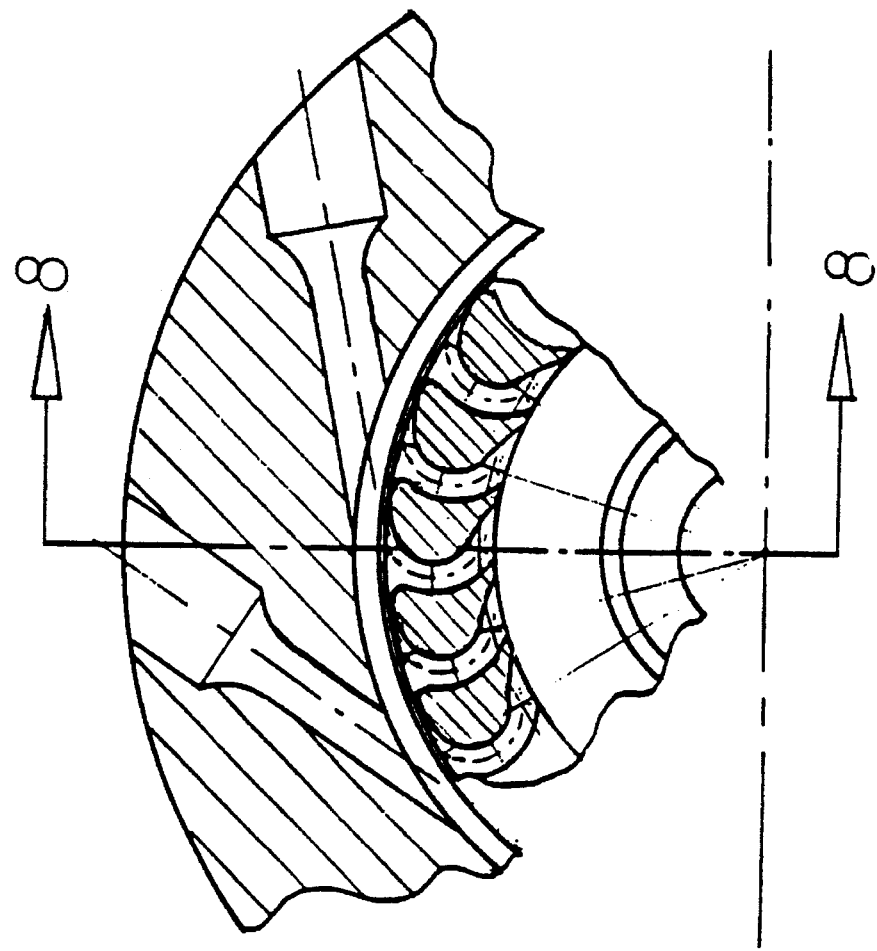

A solid metal wheel turbine is shown in FIGS. 7 and 8. My preferred metal is brass. The blades are machined. The wheel is more expensive than the metal-plastic wheel discussed above but service life could be considerably longer.

Drive for Supercharger

Figure 2:
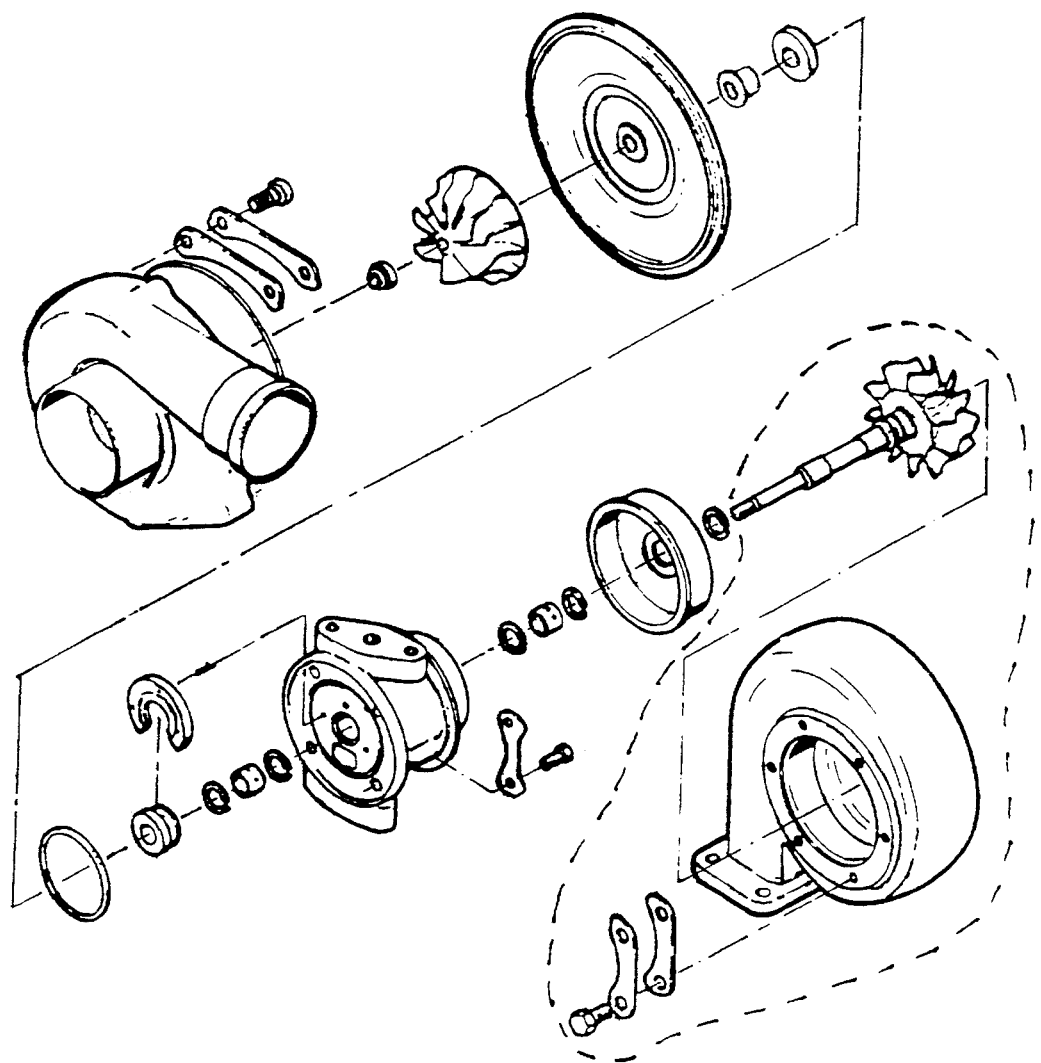
FIG. 2 is a drawing showing an exploded view of a prior art turbocharger.

The turbine described in detail herein is designed for use with the compressor and bearing assembly portion of the TO4B turbocharger, sold by Turbonetics Incorporated, 650 Flinn Avenue, Unit 6, Moorpark, Calif. A drawing of this model is shown in FIG. 2. The dashed line in FIG. 2 encircles the parts not used in a preferred embodiment of the present invention. The parts I use are individually available from the Turbonetics catalogs.

Hydraulic Supercharging System

Figure 10:
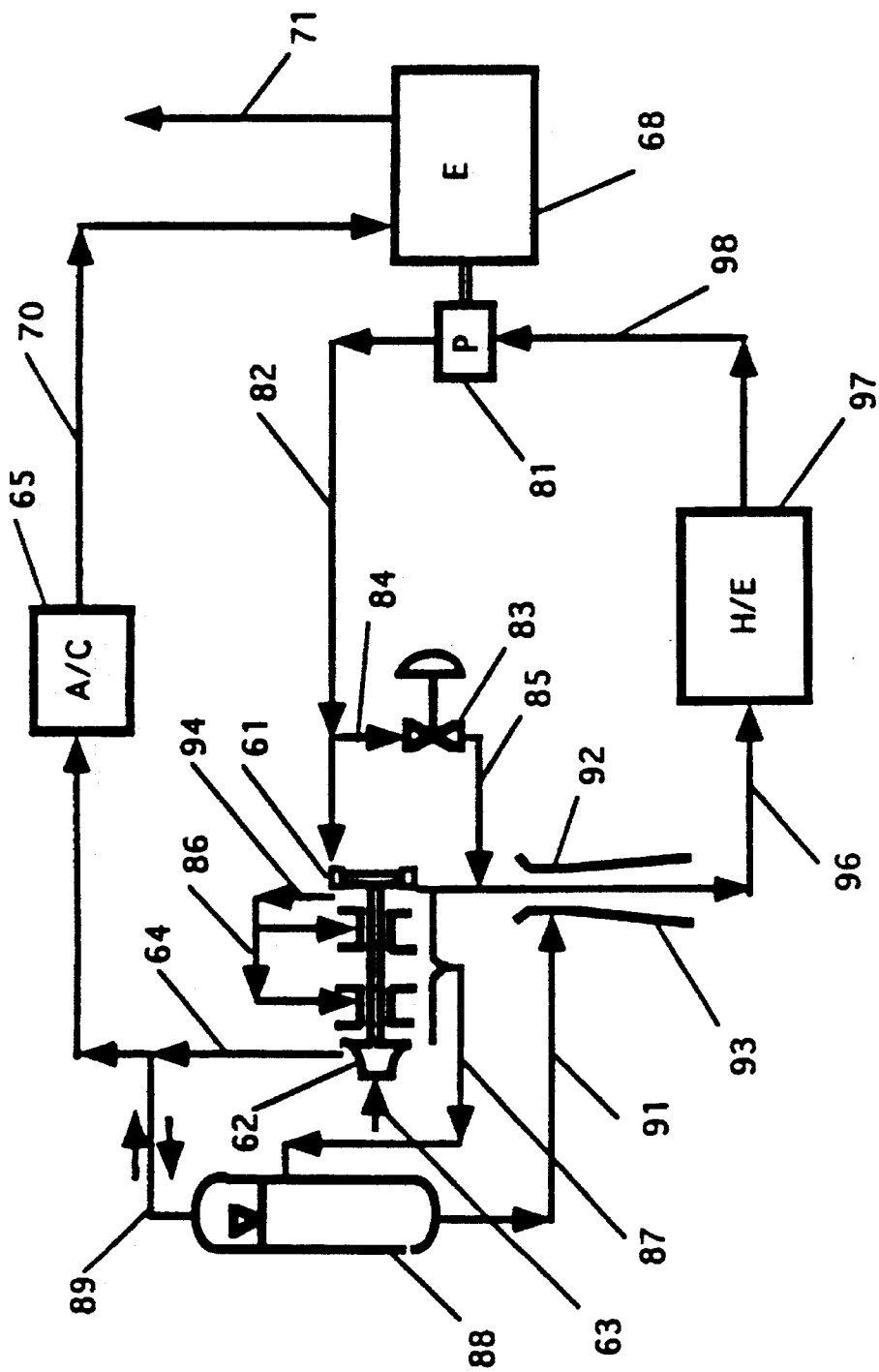
FIG. 10 is a layout of a hydraulic system utilizing my novel turbine drive.

FIG. 10 shows a one-stage supercharger hydraulic system. In this preferred embodiment, engine 68 is a standard Mazda RX-7 rotary engine producing useful mechanical power. Hydraulic pump 81 is driven by engine 68 and the pump is pressurizing, at the rate of about 27 gallons per minute, hydraulic fluid to a pressure of approximately 1000 psi into line 82 which channels the hydraulic fluid to turbine drive 8 and via line 84 to bypass valve 83. Hydraulic pump 81 is a commercially available hydraulic pump such as Parker Model H77. Supercharger compressor wheel 62 is a standard commercially available TO-4 compressor which is driven by turbine wheel 61 as shown in FIG. 10. When requiring maximum power from the supercharger 62, the bypass valve 83 closes to force all the hydraulic fluid to flow through turbine wheel 61. Conversely when requiring little or no supercharging power, bypass valve 83 may be fully open, minimizing the flow through turbine wheel 61 and essentially unloading hydraulic pump 81. Depending on a particular application, bypass valve 83 can be controlled manually or can be controlled automatically by an engine control system.

Turbine discharge line 94 is connected to bypass valve discharge line 85. The amount of flow from turbine wheel 61 discharge is reduced by the bearing lubricant flow of approximately 1.5 GPM which flows through line 86. The combined flow from the bypass valve 83 discharge and turbine wheel 61 net discharge flow are forced to flow through throat 92 of venturi nozzle 93. Throat 92 diameter is sized to provide a drop in static pressure at the throat 92 location of about 60 psi. This location serves as the return point for the lubricant flow supplied to supercharger bearings via line 86. The bearings drain line 87 is connected to expansion tank 88 which provides for thermal expansion of the hydraulic fluid and as a degassing point for the hydraulic fluid. The expansion tank is further connected via line 91 to throat 92. Bearing lubricant flow from line 91 joins at that point the combined turbine discharge and bypass valve discharge flows, flowing further through the diffuser section of venturi nozzle 93 where about 80 percent of the throat 92 dynamic head of 60 psi is recovered, thus raising the static pressure in line 96 to about 50 psi above throat 92 static pressure.

Expansion tank 88 is vented into supercharger discharge line 64 which pressurizes expansion tank 88 to supercharger discharge line 64 pressure. In turn, the expansion tank pressure being essentially at throat 92 pressure, sets the pressure levels for the entire system by providing line 96 with supercharger discharge pressure of about 10 psi plus about 50 psi pressure recovered in the diffuser section of venturi nozzle 93. The hydraulic fluid flows from line 96 into oil cooler 97 where the heat losses are rejected to ambient. Hydraulic fluid flows further via line 98 at a pressure of about 60 psi back into hydraulic pump 81. The hydraulic pressure loss of about 10 psi in the diffuser section of venturi nozzle 93 constitutes a loss of about 1 percent of 1000 psi pump pressure which in turn equals about 0.1 of 1 percent of total engine power. However, the impact of the additional net boost in power (considering pump and turbine efficiencies) due to the added air provided to the engine by the supercharger is about 50 percent. Thus, for example, the supercharger would boosts the engine power of a 100 HP MAZDA up to about 150 HP. A similar boost at full speed could be provided by a direct drive supercharger, but at low speeds (for example ⅓ speed) a supercharger according to the present invention continues to boost at about 50 percent whereas the boost provided by a typical direct drive model is only about 10 percent.

Pressurized air flowing through line 64 is typically aftercooled in the air to air aftercooler 65 where large amount of heat of compression is rejected to ambient. Relatively cool pressurized air is further charged into engine 68. Line 71 is the engine exhaust pipe.

A very important advantage of the present invention over direct drive superchargers is that the supercharger compressed air flow and pressure in the present system can be controlled independent of engine speed. This is simply done by adjusting the bypass flow through valve 83. This permits much higher power at low speeds for motor vehicles and permits easy compensation for altitude changes in airplane engines.

Figure 11:
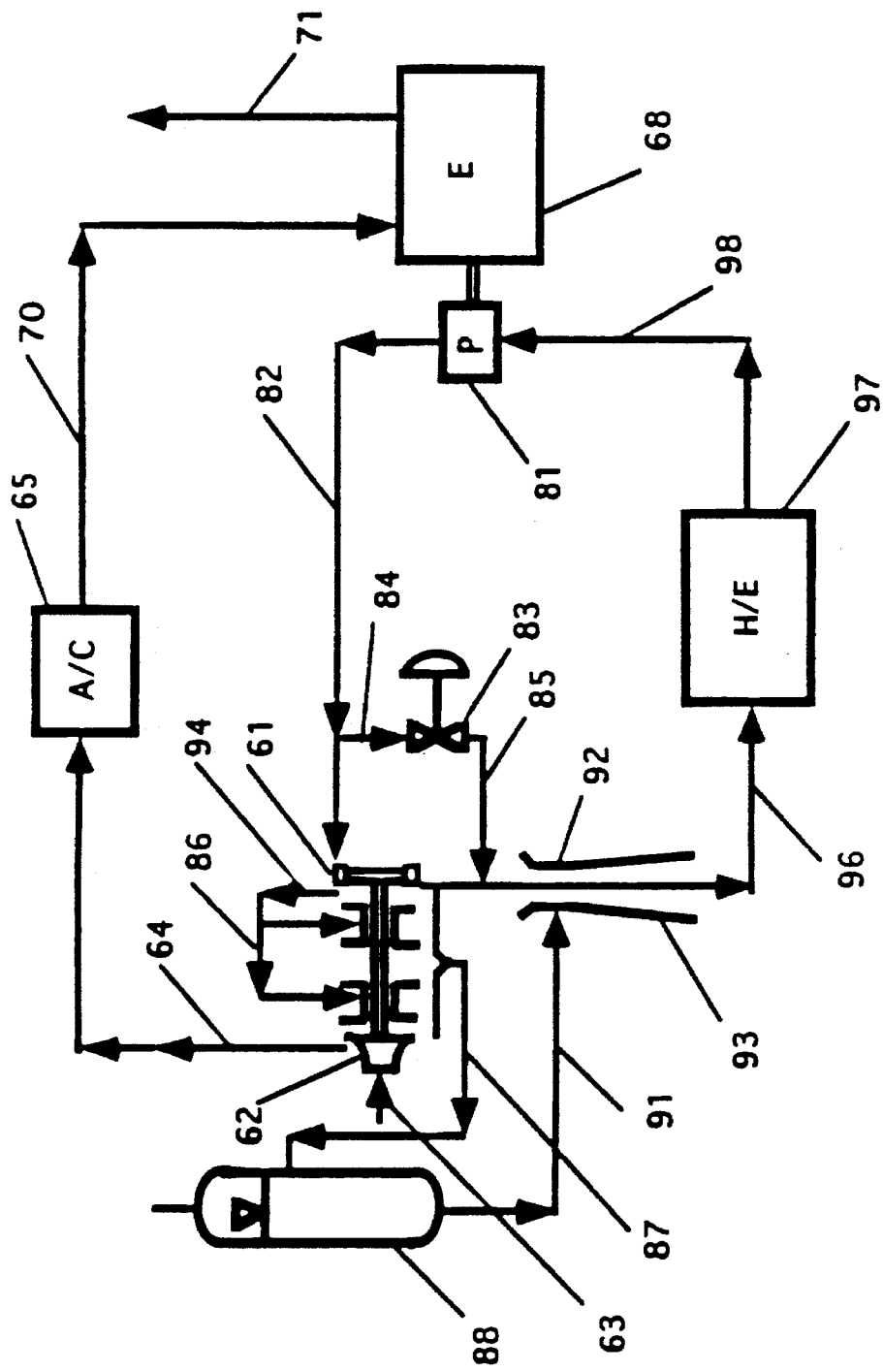
FIG. 11 is a modified version of FIG. 10.

In some instances where simplification of the overall system is desired, the expansion tank 88 may be vented directly to the atmosphere. FIG. 11 shows such a configuration.

Figure 12:
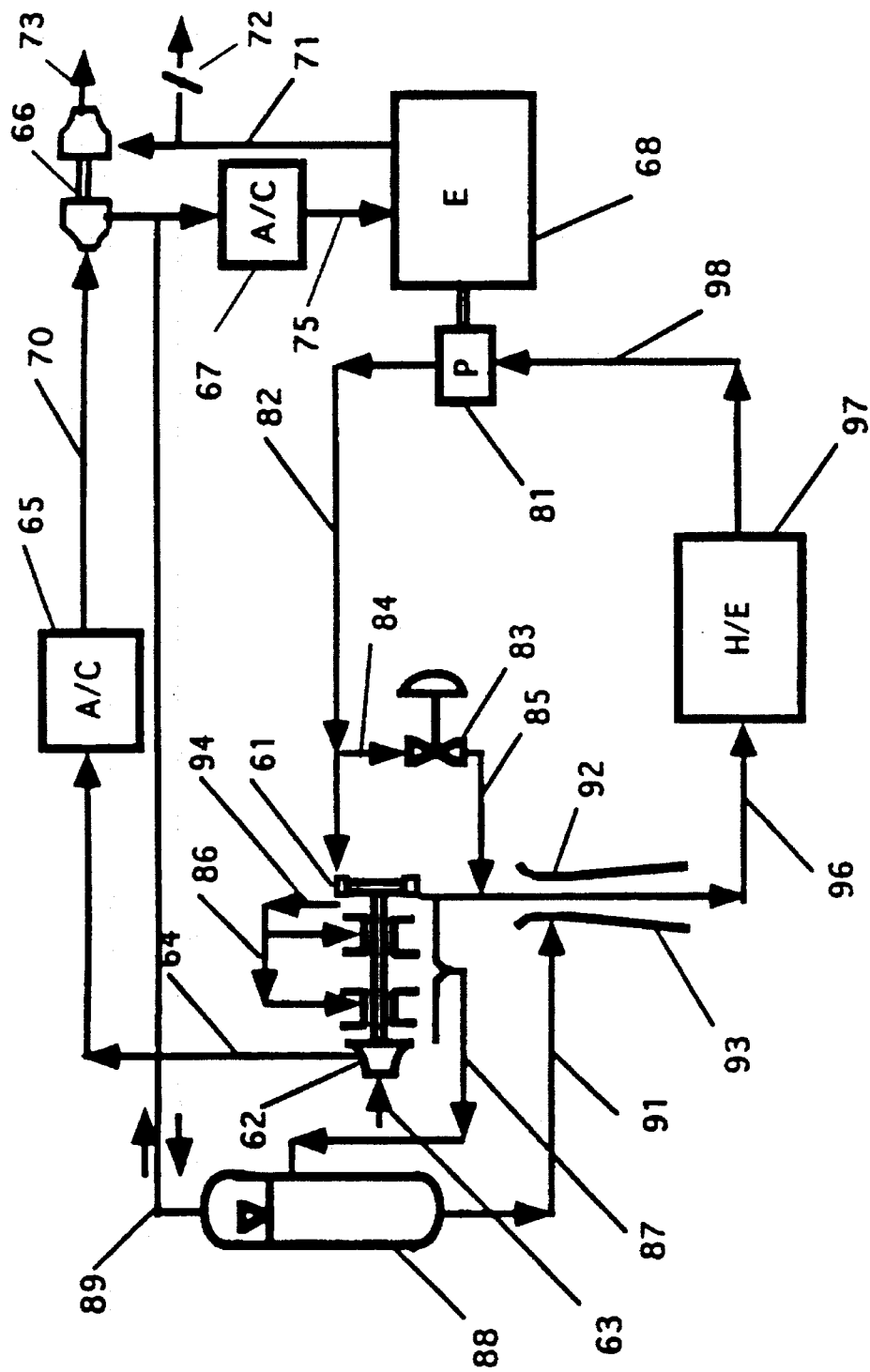
FIG. 12 is a layout similar to FIG. 11 including a turbocharger.

When multi-stage supercharging is desirable, such as in aircraft engine applications or in the case of high output engines, the expansion or in the case of high output engines, the expansion tank 88 can be vented into the discharge of the last stage supercharger. This will assure in the case of aircraft applications adequate hydraulic pump inlet pressurization even at higher altitudes. FIG. 12 shows such a case utilizing supercharger and turbocharger is series where line 89 is connected to the discharge line out of turbocharger 66. Second aftercooler 67 supplies cooled compressed air via line 75 into engine 68. Exhaust pipe 71 provides the turbine section of the turbocharger 66 with pressurized exhaust flow which after exiting turbocharger 66 turbine section flows further through line 73 to ambient or to another turbine or heat exchanger. Valve 72 provides for turbocharger 76 control to prevent overboosting engine 68.

Drive For Air Conditioning

An automotive or truck cab air conditioning system with 4 tons of cooling capacity can be provided by combining one of the high speed turbine drives described above with a commercially available compressor such as Garrett Model T-2 turbocharger compressor as shown in FIG. 2. An environmentally acceptable refrigement fluid such as DuPont HCFC 124 is utilized as the working fluid. At maximum 4 ton refrigeration capacity the compressor absorbed 6.4 HP at 72,000 RPM. The power is provided by turbine drive 8 operating at 780 psi hydraulic pressure. This provides for a very compact refrigeration compressor system that can be located anywhere on the vehicle and can be hydraulically connected and disconnected from the engine as needed. It is well known that it is difficult to control accurately the cooling capacity of the air conditioning system on the typical vehicle engine. Often, the refrigerant compressors are belt driven and therefore their cooling capacity tends to vary directly with engine RPM. The variable compressor geometry or other special control means such as ON/OFF compressor cycling via magnetic clutch is commonly employed. This causes step changes of the horse power load of the engine, which is not desirable.

With this preferred embodiment the hydraulic fluid flow through the hydraulic turbine is maintained at the desired level by controlling the bypass flow around the hydraulic turbine drive as required by the changes of the air conditioning load and engine RPM. Further improvement of this system can be accomplished by utilizing teachings of my U.S. Pat. No. 4,764,088, Inlet Guide Vanes Assembly for Pumps and Compressors Flow Control, which is incorporated herein by reference. These teachings provide for changing the compressor flow capacity in addition to bypassing the hydraulic oil flow around the hydraulic turbine drive. Combination of the hydraulic bypass control with the inlet guide vanes control provides for a more accurate capacity control over a wide range of different cooling loads and different RPM's. Both the guide vanes and the bypass valve are controlled preferably by the vehicle climate system.

A/C, Generator and Supercharger Driven by High Speed Inflow Turbine

Figure 13:
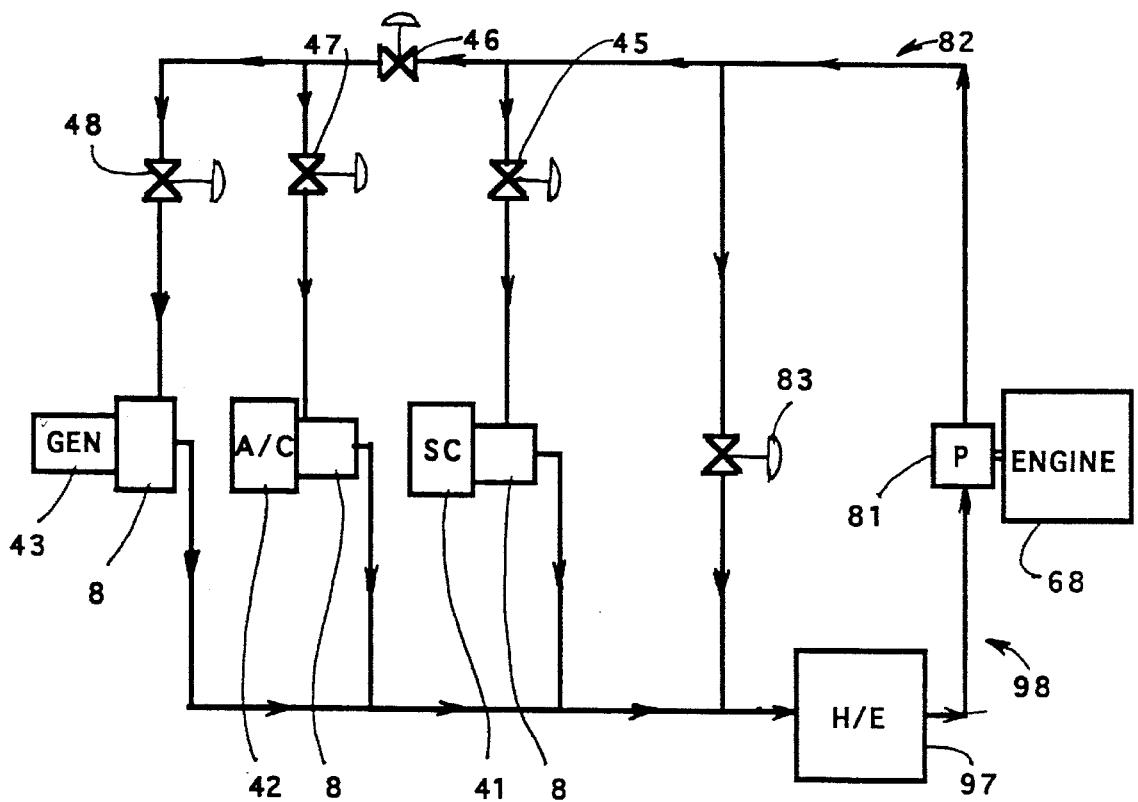
FIG. 13 shows my novel turbine drives driving a supercharger, a generator and an air conditioning unit.

FIG. 13 shows some of the elements of a hydraulic system in which my high speed radial inflow turbine drives are used on a motor vehicle engine to drive a supercharger 41, an air conditioning compressor 42 and an electric generator 43. All of these units are powered by high pressure hydraulic fluid provided by pump 81 driven by the motor vehicle engine 68. In a typical motor vehicle engine duty cycle, the supercharger is used mostly during acceleration which averages only about 2 to 5 percent of driving time in a city traffic and less than 0.5 percent on the open road. (Other elements of the system as shown in FIGS. 10, 11 and 12 should be added as desired in accordance with the above descriptions.) In order to save on the engine power and the size of the hydraulic pump 81, the air conditioning compressor 42 and the electric generator 43 are preferably shut off by valve 46 when supercharger 41 is used to supercharge the engine, with valve 45 open and bypass valve 83 closed. Valves 45 and 46 are electrically or mechanically interlocked so that one is open when the other is closed. When engine supercharger 41 is not needed to supercharge the engine, valve 46 is open and valve 45 is closed. Valve 48 regulates electric generator 43 and valve 47 regulates air conditioning compressor 42. Bypass valve 83 regulates the pressure in hydraulic supply line 82 to a minimum pressure that is sufficient to drive supercharger compressor 41 or air conditioning compressor 42 and generator 43 as may be required. Bypass valve 83 should preferably be "fail open" to avoid over pressuring pump 81.

It should be understood that the specific form of the invention illustrated and described herein is intended to be representative only, as certain changes may be made therein without departing from the clear teachings of the disclosure. There are many other uses for this turbine drive other than to drive a supercharger. Compressor units other than that of Turbonetics could be used for superchargers. Turbine wheels with diameters as low as 0.350 inch and as large as 2.0 inches could be utilized effectively under the teachings of this invention with the diameter of the nozzle exit surface slightly larger. The number of turbine blades could be increased or decreased within the range of about 18 to 40. With changes obvious to persons skilled in the art, the unit described above could be driven with other fluids such as water. Nozzle angles as small as 8 degrees and as large as 30 degrees could be used. The hydraulic system configurations shown in FIGS. 10, 11, 12, and 13 can be improved by employing a variable displacement piston pump, such as Vickers Model PVB15RSY- 31-CM-11 in which case the bypass valve 83 could be eliminated. Alternately, a second bypass valve could be added in parallel with valve 83 in order to provide a better stepwise control of the hydraulic systems shown in FIGS. 10, 11, 12 and 13. Accordingly, reference should be made to the following appended claims in determining the full scope of the invention.

I claim:

1. A hydraulic supercharger system comprising:
   (a) a hydraulic pump,
   (b) a supercharger comprising:
      i) a shaft defining a shaft axis and supported by supercharger bearings,
      ii) a high speed hydraulic radial inflow turbine drive comprising:
         (1) a turbine nozzle body defining a turbine nozzle body outlet surface and comprising a hydraulic fluid cavity and a plurality of nozzles, each of said nozzles providing a passageway for hydraulic fluid to pass inwardly from said hydraulic fluid cavity to said outlet surface and defining a nozzle centerline, where each of said nozzle centerlines:
            (A) intersects said turbine nozzle body outlet surface at a point of intersection on a circle which is concentric about said shaft axis and defines a nozzle exit circle and (B) forms an angle of 8 to 30 degrees with a tangent to said nozzle exit circle at said point of intersection, (2) a radial in-flow hydraulic turbine wheel assembly comprising a plurality of radial flow turbine blades on a blade circle having a diameter of less than 2 inches; said turbine wheel assembly being arranged in relation to said shaft and said turbine body outlet surface such that hydraulic fluid discharged from said nozzles impinges on said blades to cause rotation of said turbine wheel and said shaft, iii) a compressor driven by said hydraulic turbine drive, (c) a hydraulic venturi unit defining a main inlet, an outlet and a low pressure throat section, (d) an expansion tank, (e) a main hydraulic piping means providing a hydraulic circulation loop for hydraulic fluid to flow from said pump, to drive said hydraulic turbine drive, to said main inlet of said venturi unit, through said venturi unit, to said venturi outlet and back to said pump, (f) a supercharger bypass system comprising a controlled bypass valve and a piping means to permit a portion of said hydraulic fluid flow to bypass said supercharger turbine drive, and (g) a lubrication piping means providing a lubrication route for a portion of said hydraulic fluid flow from said turbine drive to said bearings, to said expansion tank and to said low pressure throat section of said venturi unit.

2. A system as in claim 1 and further comprising an oil cooler located within said hydraulic circulation loop.

3. A system as in claim 1 wherein said pump is driven by a combustion engine and said compressor provides compressed air to said engine.

4. A system as in claim 1 wherein said expansion tank is pressurized by exhaust air from said compressor.

5. A system as in claim 2 wherein said expansion tank is vented to so as to maintain the tank at atmospheric pressure.

6. A system as in claim 3 and further comprising a turbocharger driven by exhaust from said engine wherein said compressed air from said supercharger is further compressed by said turbocharger.

7. A system as in claim 1 wherein said turbine wheel is comprised of plastic, said plurality of blades being comprised of plastic, and a metal confinement means for confining substantially all of said plastic turbine wheel except said plurality of turbine blades.

8. A hydraulic system for a motor vehicle driven by an internal combustion engine comprising:

(a) a hydraulic pump, (b) a supercharger, (c) an electric generator, (d) an air conditioning compressor, wherein said supercharger, said electric generator and said air conditioning compressor are each driven by a high speed radial inflow hydraulic turbine comprising:

i) a shaft defining a shaft axis and supported by bearings, ii) a turbine nozzle body defining a turbine nozzle body outlet surface and comprising a hydraulic fluid cavity and a plurality of nozzles, each of said nozzles providing a passageway for hydraulic fluid to pass inwardly from said hydraulic fluid cavity to said outlet surface and defining a nozzle centerline, where each of said nozzle centerlines:

(A) intersects said turbine nozzle body outlet surface at a point of intersection on a circle which is concentric about said shaft axis and defines a nozzle exit circle and (B) forms an angle of 8 to 30 degrees with a tangent to said nozzle exit circle at said point of intersection, iii) a radial inflow hydraulic turbine wheel assembly comprising a plurality of radial flow turbine blades on a blade circle having a diameter of less than 2 inches; said turbine wheel assembly being arranged in relation to said shaft and said turbine body outlet surface such that hydraulic fluid discharged from said nozzles impinges on said blades to cause rotation of said turbine wheel and said shaft, (e) a venturi unit defining a venturi main inlet, and a venturi outlet, (f) a main hydraulic piping means providing a hydraulic circulation loop for hydraulic fluid to flow from said pump, to drive said hydraulic turbine drives, to said venturi main inlet, through said venturi unit, to said venturi outlet and back to said pump, (f) a supercharger bypass system comprising a controlled bypass valve and a piping means to permit a portion of said hydraulic fluid flow to bypass said supercharger turbine drive.

9. A very high speed radial inflow hydraulic turbine drive comprising:

(a) a shaft defining a shaft axis;

(b) a turbine nozzle body defining a turbine nozzle body outlet surface and comprising a hydraulic fluid cavity and a plurality of nozzles, each of said nozzles providing a passageway for hydraulic fluid to pass inwardly from said hydraulic fluid cavity to said outlet surface and defining a nozzle centerline, where each of said nozzle centerlines:

(1) intersects said turbine nozzle body outlet surface at a point of intersection on a circle which is concentric about said shaft axis and defines a nozzle exit circle of less than 2.2 inches and (2) forms an angle of 8 to 30 degrees with a tangent to said nozzle exit circle at said point of intersection;

(c) a radial in-flow hydraulic turbine wheel assembly comprising a plurality of radial flow turbine blades with the blade tips defining a blade circle having a diameter of less than 2 inches; said turbine wheel assembly being arranged in relation to said shaft and said turbine body outlet surface such that hydraulic fluid discharged from said nozzles impinges on said blades to cause rotation of said turbine wheel and said shaft;

wherein said turbine wheel is comprised of plastic, said plurality of blades being comprised of plastic, and a metal confinement means for confining substantially all of said plastic turbine wheel except said plurality of turbine blades.

* * * * *